No. 868,152. PATENTED OCT. 15, 1907.
L. B. ATKINSON.
APPARATUS FOR MEASURING THE FLOW OF FLUIDS.
APPLICATION FILED JUNE 15, 1906.

WITNESSES
W. P. Burke
J. H. Saunders

INVENTOR
Llewelyn Birchall Atkinson
By Richardson
ATTY'S

UNITED STATES PATENT OFFICE.

LLEWELYN BIRCHALL ATKINSON, OF LONDON, ENGLAND.

APPARATUS FOR MEASURING THE FLOW OF FLUIDS.

No. 868,152.     Specification of Letters Patent.     Patented Oct. 15, 1907.

Application filed June 15, 1906. Serial No. 321,942.

*To all whom it may concern:*

Be it known that I, LLEWELYN BIRCHALL ATKINSON, a subject of the King of Great Britain and Ireland, residing at London, England, have invented new and useful Improvements in and Relating to Apparatus for Measuring the Flow of Fluids, of which the following is a specification.

This invention relates to improvements in apparatus for measuring the flow of fluids, such as air, lighting and heating gases, steam, water etc., and has for its object the special arrangement and construction of the measuring apparatus and the placing of the same within the pipe conveying the fluid to be measured, while the indicating apparatus is outside and thus, while visible, is free from dirt or deposit from the said fluids; while avoiding friction caused by the passing of a spindle or other connecting mechanism through the wall of the pipe. By this means sensitive measuring mechanisms may be used having definite and known laws of action, and causing no loss of pressure in the fluid to be measured.

To carry my invention into effect, I arrange the measuring mechanism so that it measures the rate of flow at any given moment and such device consists of a vane, small in dimension compared with the diameter of the pipe in which the flow takes place placed perpendicularly or at a moderate angle to the direction of flow, and the pressure of the flow acting on such vane deflects or moves it against a weight or spring.

I attach to the measuring mechanism placed within the pipe a magnet, preferably permanent, acting upon a soft iron or magnetic needle forming part of a freely suspended external indicating or recording element, or of attaching to the measuring mechanism placed within the pipe a soft iron bar or needle, acting upon a freely suspended magnet on the external indicating or recording mechanism, so that the outside indicator follows the movement of the inside moving part.

Figure 1:
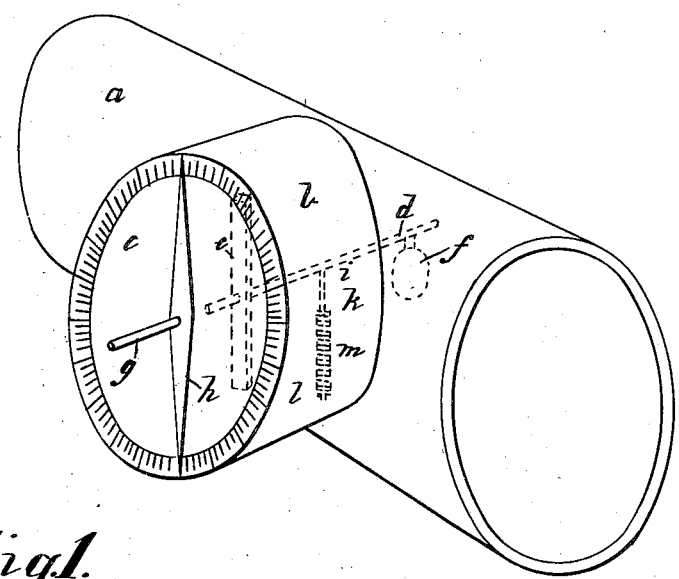

Figure 1, shows diagrammatically such an arrangement. $a$ is a pipe containing the fluid to be measured and having an angle or tee branch $b$ joined thereto. This tee is closed at the face $c$ by a non-magnetic plate, within the pipe and tee and supported by pivots not shown is a shaft or arbor $d$, carrying on it a permanent magnet $e$ and by means of an arm at right angles to the arbor, a light small vane $f$. A flow of fluid through the pipe will cause a pressure on the vane $f$ which can be normally impelled to the position shown by a weight or spring, which if the vane is small enough (say about 1/10 the diameter of the pipe) will be proportional to the square of the velocity of the fluid and to its mass per unit of volume. This will cause a movement of the vane and with it of the magnet $e$. Outside the closed end $c$ of the branch $b$ is placed another arbor $g$ carrying a soft iron or magnetized bar $h$ and freely suspended. If the closing cover at $c$ be non-magnetic the movement of the bar $h$ will correspond exactly with the movement of the magnet $e$ and hence by graduating an arc over which $h$ moves, readings may be taken which are a measurement of the flow of fluid in $a$. Since the pressure on such vane is proportional to the square of the velocity of the fluid flowing, when the flow is rapidly varying and it is requisite to obtain a true mean reading it is necessary that the restraining force should be proportional to the square of the movement. This may be achieved in various ways but one simple way is the use of a spring acting on a lever moving in an arc of a circle, so that as the tension increases from zero the effective radius increases also, and the product approximates almost exactly to the square of the angular movement and the divergence may be made very small by putting a small initial tension on the spring at the zero position and by making the spring short so that it takes an angular position instead of remaining parallel to its original position.

Figures 2, 3:
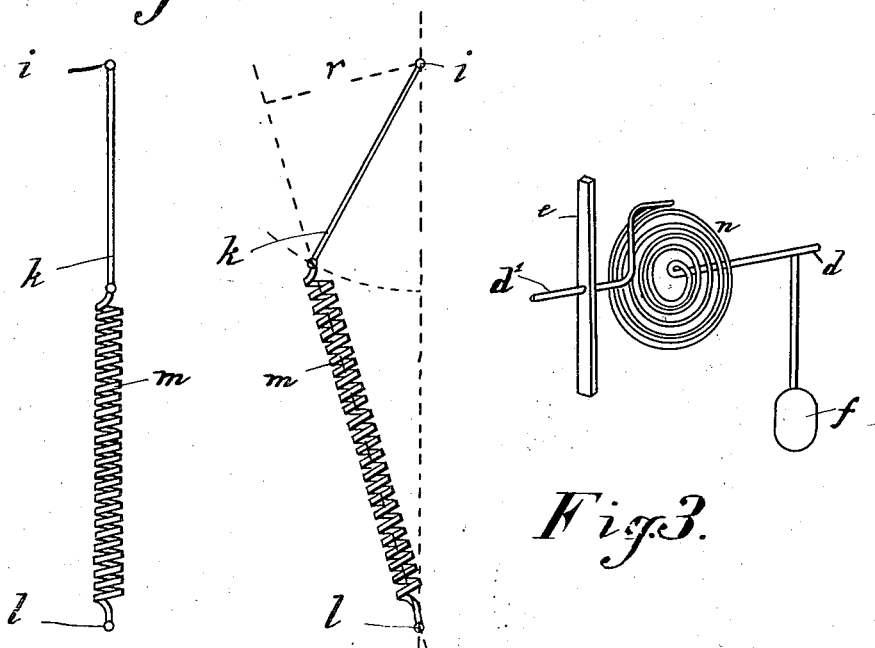

Fig. 2 shows the arrangement in detail as indicated in Fig. 1. $i$ is the center of angular movement of the lever $i k$. $l$ is a fixed point. A spring $m$ unites $k$ to $l$ and has little or no initial tension in the portion shown in the left hand view. The right hand view shows the lever $i k$ when it has moved through a certain angle, the tension on the spring is proportional to the lengthening that has taken place, the effective radius at which the spring pull acts is $r$, and by proportioning the length $k l$ this radius may be made proportional to the angle moved through. Approximately $k l$ should be initially about $1\frac{1}{2}$ times $i k$.

Where the variations of flow are very rapid as for instance in a steam pipe supplying an engine, or a water pipe through which water is being pumped by a rapidly moving pump the mass of the magnet may be such that it has a periodic time too large to allow it to follow such rapid movements and in this case its mean position need not indicate the true mean of the squares of the velocities of flow. In such case the moving vane may act through an elastic connection so that the magnet comes to the mean position without itself rapidly following the variation. Fig. 3 shows such an arrangement diagrammatically.

$d$ is the arbor carrying the vane $f$, $d^1$ is a separate arbor carrying a magnet $e$, these are independent of one another except for a connection by spiral spring $n$. The control of the vane $f$ is not shown for simplicity but is for example of the type described in Fig. 2. The mean position of the vane is therefore determined by the mean of the squares of the velocities of flow, and the position of the magnet *e* being dependent on a spring whose tension is proportional to the angle of twist, is the mean angular position of the vane *f*.

Having now described my invention, what I claim and desire to secure by Letters Patent is:—

1. Apparatus for indicating the rate of flow of a fluid consisting of a pipe, a vane of small area relative to the sectional area of the said pipe pivotally mounted within and adapted to be directly deflected by the flow of fluid through the said pipe, a yielding resistance adapted to act on said vane in opposition to the force of the flow, a magnet carried by said vane within said pipe and a magnetic indicator moving in magnetic relation thereto, disposed external to the pipe, substantially as described.

2. In apparatus for indicating the rate of flow of a fluid consisting in combination a pipe, a vane of small area relative to the sectional area of the said pipe adapted to be moved by the fluid, a yielding resistance device consisting of a lever adapted to move in an arc of a circle to which is attached a spring disposed so that at the zero position little or no initial tension is exerted by the spring on the said lever but that from zero position the action of the spring on the vane increases in greater proportion than the movement of the vane and magnetic means for indicating the movement of the vane within the pipe on the exterior thereof, substantially as described.

3. An apparatus for indicating the rate of flow of a fluid consisting of a pipe, a vane of small area relative to the sectional area of the said pipe pivotally mounted within and adapted to be directly deflected by the flow of fluid through the said pipe, a yielding resistance adapted to act on said vane in opposition to the force of the flow, a magnet carried by said vane within said pipe, a magnetic indicator moving in magnetic relation thereto disposed external to the pipe and elastic means of connection between the vane and the magnetic element, substantially as described.

In testimony whereof I have signed my name to this specification in the presence of two subscribing witnesses.

LLEWELYN BIRCHALL ATKINSON.

Witnesses:
REGINALD WILLIAM JAMES,
CHARLES CARTER.